United States Patent

[11] 3,585,368

[72] Inventor Thomas A. Nunamaker
837 Cuyler, Oak Park, Ill. 60302

[21] Appl. No. 848,550
[22] Filed Aug. 8, 1969
[45] Patented June 15, 1971

[54] APPARATUS FOR CAPACITIVELY SENSING INFORMATION APERTURES IN DATA CARDS
3 Claims, 4 Drawing Figs.

[52] U.S. Cl. ........ 235/61.11, 340/173
[51] Int. Cl. ........ G06k 7/08, G11b 9/06
[50] Field of Search ........ 235/61.11, 61.11 H; 340/173

[56] References Cited

UNITED STATES PATENTS

| | | | |
|---|---|---|---|
| 3,123,706 | 3/1964 | French | 235/61.11 H |
| 3,397,393 | 8/1968 | Palmateer et al. | 340/173 |
| 3,404,382 | 10/1968 | Rosenheck et al. | 340/173 |

*Primary Examiner*—Daryl W. Cook
*Attorney*—Burmeister, Palmatier & Hamby

ABSTRACT: Card reading apparatus comprising a plurality of input conductors for disposition along one side of a data card incorporating an electric shield and a plurality of readout conductors for disposition along the opposite side of the card to establish a capacitive coupling between the readout conductors and the input conductors through selectively positioned apertures in the shield representing recorded information. A plurality of voltage stabilizing capacitors have output sides connected to the respective readout conductors. A plurality of voltage stabilizing amplifiers have inputs connected to the respective readout conductors and outputs connected to the input sides of the respective capacitors. Information receiving means is coupled to the input side of each capacitor to respond to the change in voltage applied thereto by the corresponding amplifier upon energization of an input conductor to which the corresponding readout conductor is coupled capacitively through an aperture in the electric shield. The capacitance of each capacitor and the gain of each amplifier operate together in response to an incipient change in voltage on the corresponding readout conductor to restore continuously the original voltage on the conductor so that the input to the information receiving means is not rendered inaccurate by spurious and parasitic capacitive relationships of the readout conductors to adjacent structure.

Inventor:
Thomas A. Nunamaker
By:
Burmeister, Palmatier & Hamby
Attys.

Inventor:
Thomas A. Nunamaker
By: Burmeister, Palmatier & Hamby
Attys.

APPARATUS FOR CAPACITIVELY SENSING INFORMATION APERTURES IN DATA CARDS

The present invention relates to apparatus for reading information recorded in apertured data cards and more particularly to data card reading apparatus which operates by capacitively sensing information apertures in data cards incorporating thin electric or electrostatic shields.

It has been recognized that the use of data cards incorporating thin electric shields, which can be apertured selectively to record information, offers many potential advantages. The electric shield formed normally by a thin layer of electrically conductive material incorporated into the card can be apertured selectively in various positions to record information by punching the card, for example, or in any preferred alternative manner as by photographic etching or the like. Moreover, the fact that it is unnecessary to make more than one direct electrical connection with each card minimizes the likelihood of error arising from poor connections with the cards.

A potentially advantageous approach to sensing the number and positions of the apertures representing recorded information involves the positioning of conductors of card reading apparatus adjacent opposite sides of a card to be read and the sensing of a shield aperture by active electrical capacitance established between individual conductors on opposite sides of the card.

Heretofore, the potential advantages to be realized from the use of data cards incorporating apertured electric shields and the capacitive sensing of shield apertures representing recorded information have not been fully realized, as a practical matter, on account of inaccuracies and functional difficulties that have heretofore constituted serious problems in the capacitive reading of such cards with assured accuracy. More particularly, the functional capabilities and accuracy of card reading apparatus designed to capacitively sense information apertures in data cards have been adversely effected by the presence and effect of spurious and parasitic capacitive relationships to adjacent structure of the conductors which sense the presence and location of individual apertures.

In the operation of prior card reading apparatus, such spurious and parasitic capacitance have been a source of errant signals and "noise" that have interfered with reliable and accurate functioning of the card reading apparatus.

One object of the invention is to provide for reading data cards incorporating electrically conductive shields apertured to record information, new and improved data card reading apparatus that prevents spurious and parasitic capacitive relationships between the card reading conductors from having an adverse effect on accurate and reliable reading of the cards through the capacitive sensing of the presence and location of shield apertures representing recorded information.

Another object is to provide for the capacitive reading of data cards of the character recited, new and improved card reading apparatus that deals in most effective and practical manner with problems of noise and spurious signals previously associated with the capacitive reading of such cards to provide to associated information receiving means accurate and reliable reading of information recorded in the cards.

A further object is to provide data card reading apparatus of the character recited which functions to maintain readout conductors, which capacitively sense the presence and location to capacitively apertures, at a substantially constant voltage level to prevent the input to associated information receiving means from being adversely effected as a practical matter by noise and spurious signals arising from parasitic capacitive relationships of the readout conductors to adjacent structure.

A further and more specific object is to provide data card reading apparatus of the character recited in which the voltage of individual readout conductors which function to capacitively sense the presence and location of individual apertures is stabilized by the flow of electrical charge between the individual readout conductors and voltage stabilizing capacitors connected with the respective readout conductors and having input sides connected with the outputs of voltage stabilizing amplifiers corresponding to the respective readout conductors and having inputs connected with the respective readout conductors, the capacitance of the voltage stabilizing capacitor and the gain of each voltage stabilizing amplifier coacting with each readout conductor being coordinated in design to operate in response to an incipient change in voltage on the readout conductor, incident to charging of an input conductor to which the readout conductor is capacitively coupled through a card aperture, to restore continuously the original voltage on the readout conductor so that the input to information receiving means is not rendered inaccurate by spurious signals or noise arising from spurious and parasitic capacitive relationships of the readout conductors to adjacent structure, the information receiving means being connected to the sides of the respective voltage stabilizing capacitors opposite from the readout conductors.

Other objects and advantages will become apparent from the following description of the exemplary embodiment of the invention illustrated in the drawings, in which.

Figures 1, 2, 3:
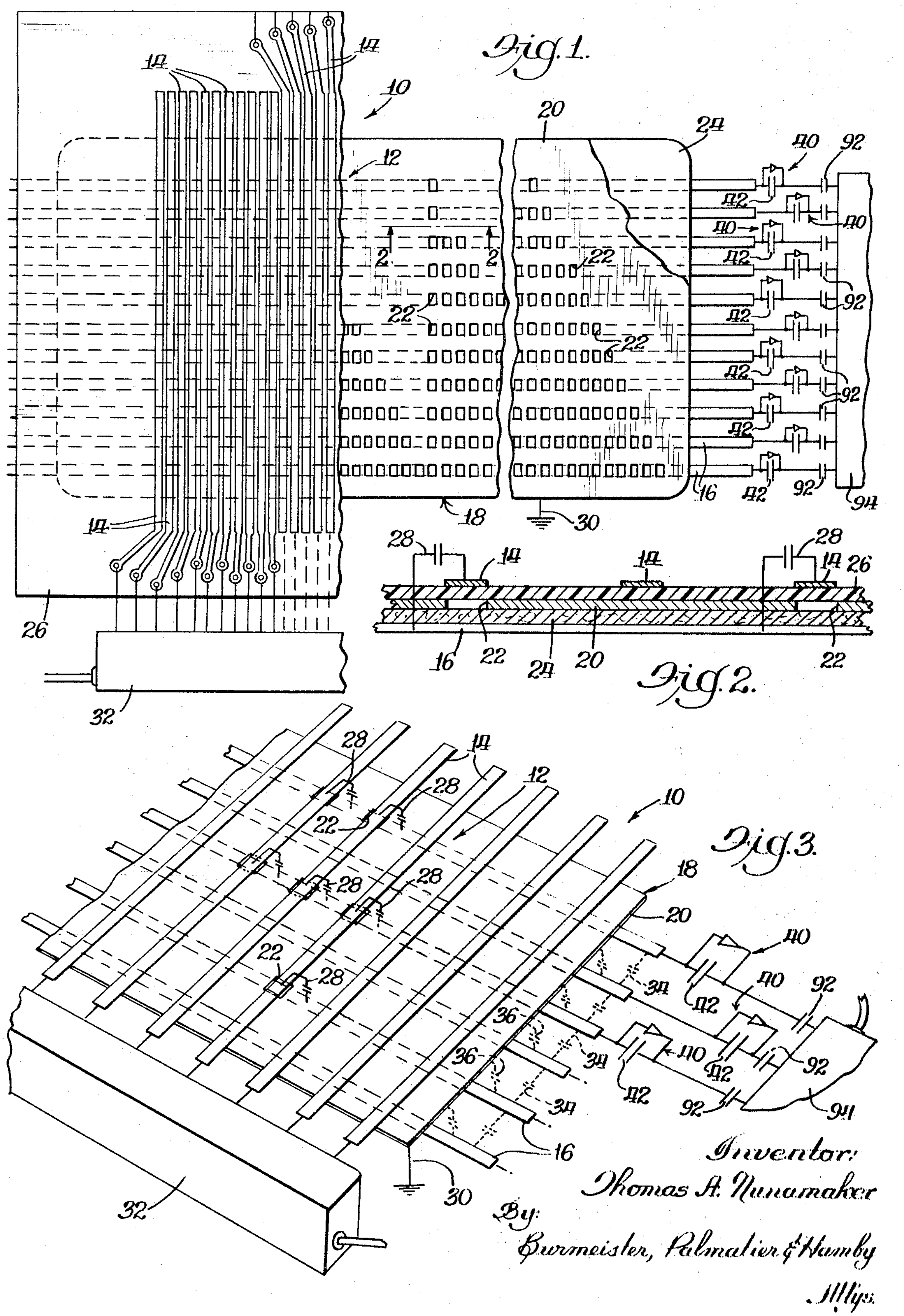
FIG. 1 is a simplified plan view of data card reading apparatus incorporating the invention, certain parts being broken away to reveal underlying structure and other components being illustrated schematically and diagrammatically.
FIG. 2 is a fragmentary sectional view on an enlarged scale taken along the line 2–2 of FIG. 1.
Figure 4:
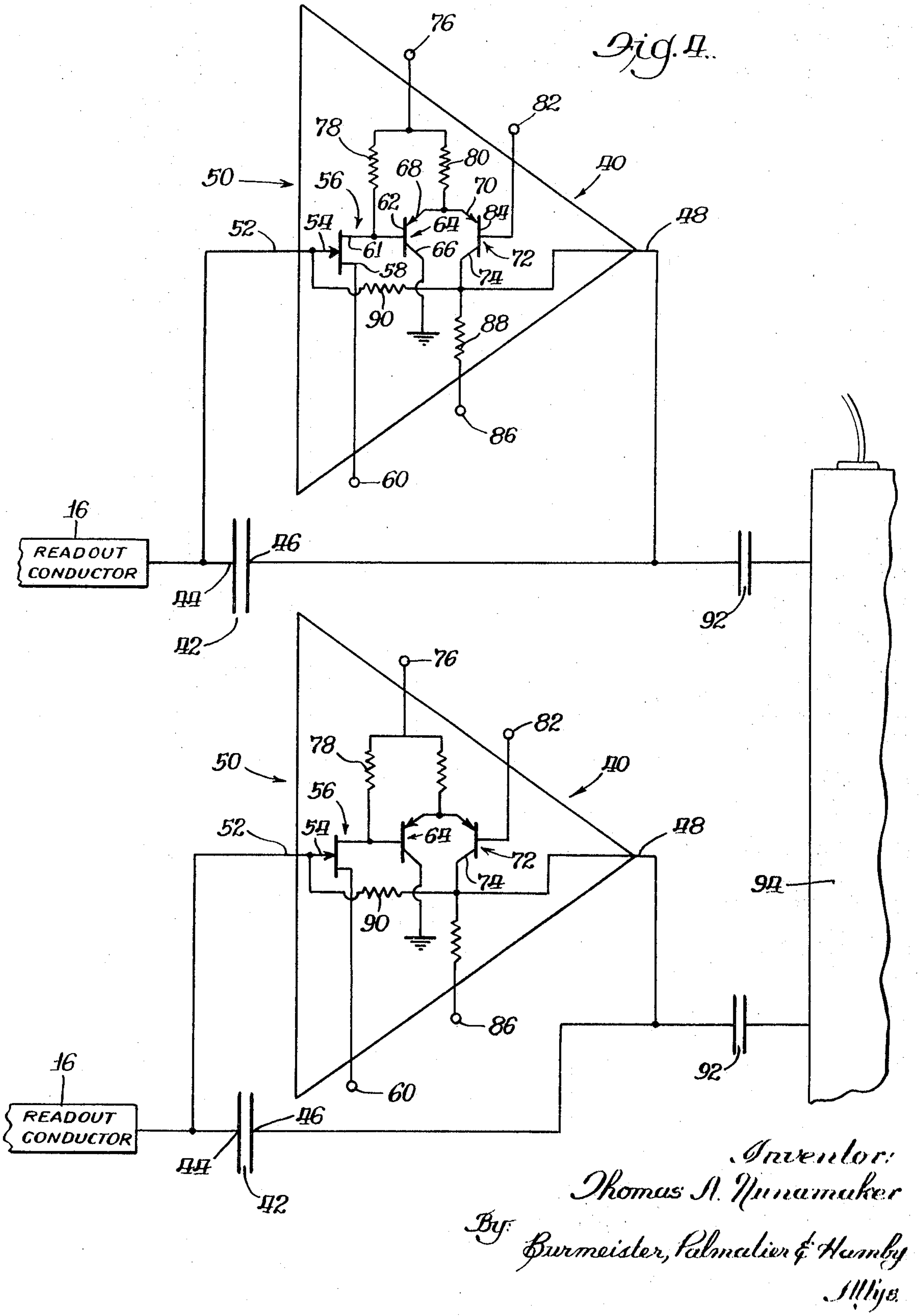

FIG. 3 is a fragmentary perspective view of the apparatus of FIG. 1 in which dielectric components of the data card and reading apparatus are eliminated for clearness in illustration and significant capacitive relationships are illustrated symbolically with phantom lines used in the symbolic illustration of parasitic capacitances; and FIG. 4 is a diagrammatic view on a much enlarged scale of electrical circuitry used in obtaining reliable and accurate capacitive sensing of the presence and location of apertures representing recorded information.

In a general way, the data card reading apparatus embodying applicant's invention and denoted generally by the number 10 in FIGS. 1 and 3 comprises a grid 12, FIG. 3, of individually separate card-reading conductors 14, 16 having a capacitive relationship to each other.

The conductors 14 are a series of spaced, parallel input conductors adapted to be disposed adjacent one side of a data card 18 to be read. The conductors 16 constitute a series of spaced, parallel output or readout conductors oriented in transverse crossed relation to the input conductors 14, as illustrated in FIGS. 1, 2 and 3, and being adapted for disposition adjacent the opposite side of a typical data card 18 to be read. As will appear, the input conductors 14 and the readout conductors 16 are spaced from each other sufficiently to accommodate therebetween a card 18 to be read and such layers of dielectric material as may be necessary or desirable for insulating purposes while at the same time providing between each input conductor 14 and each readout conductor 16 a capacitive coupling subject to selective blocking by an intervening data card 18 as will presently appear.

The typical data card 18 to be read comprises a thin layer of electrically conductive material 20 which functions, when the card is interposed between the input conductors 14 and the readout conductors 16 for card reading purposes, to generally block the capacitive coupling of the individual input conductors 14 to the individual readout conductors 16 except where capacitive coupling of individual input conductors 14 with individual readout conductors 16 is specifically provided selectively by apertures formed in the electric shield 20 in positions aligned with mutually confronting portions of the input and readout conductors that are to be selectively coupled capacitively. In the drawings, typical apertures in the thin layer of conductive material 20 which, for convenience, will be referred to as an "electric shield" or "electrostatic shield" are denoted by the number 22.

As is well understood in the art of recording and retrieving information by means of data cards of this character, the number and positions of the apertures 22 formed in the shield 20 represent information recorded in code and sensed in the manner to be described.

The present invention contemplates that the apertures 22 will be formed selectively in the shield 20 in any preferred manner such, for example, as by punching, photographic etching or other process that may be deemed most advantageous.

In the construction illustrated, the thin electrically conductive shield 20 of the card 18 is laminated onto a dielectric base layer 24 of the card, which may be formed of paper. The apertures 22 may or may not extend through the base layer 24, depending upon the manner in which the apertures are produced in the shield 20.

For the purpose of illustration, the card 18 is oriented so that the base layer 24 confronts the readout conductors 16 and forms an electrical insulator between the readout conductors 16 and the electric or electrostatic shield 20. To insulate the input conductors 14 from the card shield 20, a layer 26, FIGS. 1 and 2, of dielectric material is incorporated into the reading apparatus 10 to intervene between the series of input conductors 14 and the conductive card shield 20, the dielectric insulating layer 26 being limited in thickness to enhance the capacitive relationship provided between the input conductors and the readout conductors by virtue of their physical proximity to each other as disposed on opposite sides of the thin shield 20 electrically perforated by apertures representing encoded information. The electrical capacitance established between each input conductor 14 and each readout conductor 16 by reason of the positional relationship of the input conductors and readout conductors to each other and operating through individual apertures 22 in the shield 20 to capacitively couple individual in conductors 14 to individual readout conductors 16 is represented in FIG. 3 by symbols for electrical capacitance shown in solid lines and denoted by the number 28.

As previously indicated, the electrical capacitance 28 normally coupling individual input conductors 14 with individual readout conductors 16 is blocked by the intervening electric shield 20 of the card 18 being read except where an aperture 22 appears in the shield 20 in alignment with mutually crossing portions of an individual input conductor and an individual readout conductor. The electric shield 20 of the card 18 being read is preferably grounded, as indicated diagrammatically in FIGS. 1 and 3, by contact of the shield with a grounded contact 30.

With reference to the construction illustrated, the locations in which the shield 20 can be apertured to record information are disposed in longitudinal rows which align with the respective readout conductors 16 nd transverse columns which align with the respective input conductors 14, as indicated in part by the apertures 22 appearing in FIG. 1.

To read a typical card 18, the input conductors 14 are briefly energized sequentially in any desired order that may be programmed into the card reading machine 10 using generally conventional input conductor energizing means illustrated schematically in FIGS. 1 and 3 and denoted by the reference number 32. Normally, energization of an input conductor 14 consists in applying a voltage to the conductor so that its voltage is temporarily changed from the normal voltage of the input conductors. The presence and position of any information recording apertures 22 formed in the shield 20 in alignment with the particular input conductor 14 energized is sensed by the readout conductors 16. As previously explained, the presence of an aperture 22 in the shield 20 in alignment with a particular input conductor 14 that is energized and a particular readout conductor 16 provides for coupling of the input conductor and readout conductor mutually aligned with the aperture by the coupling capacitance 28, FIGS. 2 and 3. Consequently, the change in voltage of any particular input conductor 14 that is energized tends to effect a change in voltage on each of the readout conductors 16 that is capacitively coupled through a shield aperture 22 with the energized input conductor 14.

The number of readout conductors 16 that may be subject to a change in voltage as an incident to energization of any particular input conductor 14 may vary to include all of the readout conductors 16, none of the readout conductors 16 or any intermediate number of the readout conductors depending upon the number of shield apertures 22 that are mutually aligned with the particular input conductor energized and the individual readout conductors.

It would appear, therefore, to be a simple matter to sense the changes in voltage on the individual readout conductors 16 effected as a consequence of energization of a particular input conductor 14 and thereby determine the number and location of any data recorded on apertures 22 aligned with the energized readout conductor. However, this approach, which appears logical and effective, has heretofore been attended by serious problems of a practical character which have restricted and inhibited the commercial adoption and usage of data cards including an electric shield and designed for capacitive reading of apertures representing information.

In this connection, it should be borne in mind that there are practical limitations on the capacitance 28 that can be provided through an aperture 22 to couple an individual input conductor to an individual readout conductor, this limitation of coupling capacitance being due to practical limitations on the size of the apertures 22, which aperture-size limitations arise in turn from the practical necessity for providing for a substantial number of longitudinal rows and transverse columns of apertures on a data card of a practical size.

On account of these practical considerations, the capacitance 28 by which a readout conductor 16 is coupled through an aperture 22 with an individual input conductor 14 is rather limited. At the same time, each readout conductor 16 is capacitively coupled to each adjacent readout conductor 16 and, in varying degrees, to all of the readout conductors 16 by reason of the proximate parallel relation to the readout conductors 16 to each other. The capacitive coupling of each readout conductor 16 to each of the immediately adjacent readout conductors 16 is represented symbolically in FIG. 3 by a symbolic representation of capacitance denoted by the number 34. A capacitive coupling of each readout conductor 16 to each of the more remote readout conductors 16 exists significantly, but is not represented graphically in FIG. 3 for the sake of clarity.

Also, each readout conductor 16 is capacitively coupled to the card shield 20 to which all the readout conductors are coupled capacitively. The capacitive coupling of each readout conductor 16 to the shield 20 as a whole arises from the proximity of the conductor to the shield 20 and is represented graphically in FIG. 3 by a phantom symbolic representation of capacitance denoted by the reference number 36.

Heretofore, information receiving means that has responded to changes in voltage of readout conductors 16 as an expedient for sensing the presence and location of apertures in cards of the character described has been subject to deception and other functional problems involving inaccuracies and unreliability arising from spurious signals and "noise" generated as a consequence of voltage increase in the various readout conductors which are capacitively coupled not only to individual input conductors 14 through the shield apertures 22 but also to other readout conductors and adjacent structure that is subject to indeterminate and varying changes in voltage.

As previously intimated, problems of this kind have, as a practical matter, complicated and inhibited the use of capacitively read data cards of the character referred to. Such operational problems, previously complicating and interfering with proper functioning of card reading apparatus of this character, are obviated in applicant's apparatus in which the voltage on each readout conductor 16 is stabilized continuously at its normal level, even when the readout conductor is capacitively coupled through a shield aperture 22 to an input conductor 14 that is energized. The desired stabilization of the voltage of each readout conductor 16 at its normal level is provided by a plurality of voltage stabilizing units 40 corresponding to the respective readout conductors, FIGS. 1, 3 and 4. Each voltage stabilizing unit 40 comprises a voltage stabilizing capacitor 42 having an output side 44 connected to the corresponding readout conductor 16 and having an input side 46 connected to the output 48 of a voltage stabilizing amplifier denoted generally by the number 50, FIG. 4, and being preferably a high gain voltage amplifier of high input impedance. The input 52 of each amplifier 50 is connected to the corresponding readout conductor 16 and consequently to the output side 44 of the corresponding voltage stabilizing capacitor 42.

By way of example, the capacitance 28 by which a typical readout conductor 16 is coupled through a shield aperture 22 with an input conductor 14 may be of the order of $1.5\times10^{1}13$ farads. The voltage compensating capacitor 42 connected to each readout conductor is selected to have a capacitance correlated with the conductor coupling capacitance 28 and preferably being only a small multiple of the corresponding capacitance 28. With reference to the example mentioned, each voltage compensating capacitor 42 may advantageously have a capacitance of the order of $5\times10^{113}$ farads.

By way of illustration, the circuitry of an exemplary voltage compensating amplifier 50 having a high input impedance and a high voltage gain is illustrated diagrammatically in FIG. 4. As shown, the input 52 from the associated readout conductor 16 to the typical amplifier 50 is connected to the gate 54 of an N channel junction field effect transistor 56 which may, for example, be a MPF–105. The source 58 of the transistor 56 is connected to a positive 3-volt power source 60. The drain 61 of the transistor 56 is connected to the base 62 of a second transistor 64, which can be a 2N4125. The collector 66 of the transistor 64 is grounded and the emitter 68 of the transistor 64 is connected to the emitter 70 of a similar transistor 72 that can also be a 2N4125. The collector 74 of the transistor 72 is connected to the output 48 of the amplifier 50 which, as previously indicated, is connected to the input side of the voltage compensating capacitor 42.

A positive 12-volt power source 76 is connected through a 6000-ohm resistor 78 with the source 61 of the transistor 56 and the base 62 of the transistor 64. The positive 12-volt power source 76 is also connected through a 2000-ohm resistor 80 with the emitters 68, 70 of the respective transistors 64, 72. A positive 6-volt power source 82 is connected to the base 84 of the transistor 72 and a negative 6-volt power source 86 is connected through a 4000-ohm resistor 88 with the collector 74 of the transistor 72.

Each voltage stabilizing amplifier 50 is preferably stabilized by means of a resistor 90 connected between the output 48 and input 52 of the amplifier 50 and having a rather high resistance which can, for example, be $2\times^{7}$ ohms. However, the input impedance of the typical voltage compensating amplifier 50 is much greater than the impedance of the stabilizing resistor 90 with the consequence that the static voltages on the input 52 and output 48 of the amplifier 50 are nearly the same. If desired, the voltage of the power supply source 60 can be adjusted for each amplifier to compensate for deviations from design values which may be inherent in the particular junction field effect transistor 56 used in the amplifier and thereby assure equalization of the static voltage on the amplifier output 48 with that on the amplifier input 52. However, in most cases it is not necessary to adjust the voltage of the source 60 to equalize the input and output voltages of the amplifier because only pulses of short duration are transmitted through the amplifier, the voltage applied by the amplifier to the input 46 of the corresponding voltage compensating capacitor 42 being sensed, as will be explained, through a coupling capacitor 92.

With reference to the example described, the voltage on a particular input conductor 14 being energized by the input conductor energizing means 32 may be changed 10 volts from the normal voltage applied by the energizing means 32 to all the other input conductors 14. For any readout conductor 16 coupled through a shield aperture 22 to the particular input conductor 14, energized by a voltage differential of 10 volts as described, the apparatus will produce on the input side 46 of the corresponding voltage compensating capacitor 42 a voltage change of 3 volts. These operating characteristics are mentioned illustratively by way of example.

At the same time the voltage applied to the input side 46 of the voltage compensating capacitor 42 changes as a consequence of the corresponding readout conductor 16 being coupled through an aperture 22 to an energized input conductor 14 in the manner described, the voltage compensating capacitor 42 under the electrostatic pressure of the changed voltage applied to the input 46 of the capacitor 42 functions to continuously maintain substantially the normal voltage on the corresponding readout conductor 16. In this connection, it will be appreciated that the corresponding voltage compensating amplifier 50 responds to an incipient change in voltage on the readout conductor 16 to exert sufficient electrostatic pressure through the coacting voltage compensating capacitor 42 to produce the desired maintenance of the readout conductor substantially at its normal voltage level, the effective functional values of the voltage compensating amplifier 50 and voltage compensating capacitor 42 being selectively designed as described for this purpose.

As a consequence of each readout conductor 16 being maintained substantially at its normal voltage during the sensing of all apertures 22 aligned with a particular input conductor 14, the spurious and parasitic capacitances 34, 36 by which the readout conductors are coupled to adjacent structures do not interfere with reliable and accurate sensing of the apertures.

It is also noteworthy that the transit or delay time lapsing between the application of an energizing voltage to an input conductor 14 and the consequent change in voltage on the input 46 of each voltage compensating capacitor 42 connector with a readout conductor 16 which senses a shield aperture 22 is very short in relation to other relevant time periods to be mentioned, being of the order of $20\times10^{1}9$ seconds. After effecting quickly the change in voltage on the input side 46 of the corresponding capacitor 42 requisite to restoring substantially the normal voltage of the active readout conductor 16, the output voltage of the corresponding amplifier 50 will slowly decay due to leakage through the stabilizing resistor 90. For the component values mentioned by way of example, the duration of the decay will be of the order of $10{,}000\times10^{1}9$ seconds. However, this decay is of no consequence as the period during which each input conductor 14 is energized and the sensing of shield apertures 22 aligned with the individual input conductor 14 is completed may be limited to a period ranging from 100×109 seconds to $1{,}000\times10^{6v1}9$ seconds. In other words, the reading operation is completed long before the voltage decay on the input 46 of the voltage compensating capacitor 42 has become significant.

Moreover, by virtue of the high input impedance capabilities of junction field effect transistors, such as the transistors 56 incorporated into the individual amplifiers 50, the amplifier stabilizing resistors 90 can have resistances much higher than the resistance mentioned by way of example. As a consequence, it is practical to energize the individual input conductors 14 for individual periods of time lasting considerably longer than the $1{,}000\times10^{-9}$ second period mentioned. The capability of the apparatus to handle such longer periods of energization of the input conductors 14 allows sufficient time for the switching transients within the information matrix conductors 16 to die out before the voltages applied by the voltage compensating amplifiers 50 to the individual voltage compensating capacitors 42 is sensed to determine the number and location of the shield apertures aligned with the energized input conductor 14.

The voltages selectively applied to the inputs 46 of the voltage compensating capacitors 42 in the manner described and representing shield apertures 22 aligned with an energized input conductor 14 are coupled to information receiving means 94 having the capacity of usefully storing, transmitting, tabulating or processing in any desired manner the information represented by the apertures 22. As illustrated, the input sides 46 of the respective voltage compensating capacitors 42 are coupled to the information receiving means 94 through the individual coupling capacitors 92.

By virtue of the suppression and effective elimination of the troublesome consequences which would otherwise be manifest from the spurious and parasitic capacitive relationships referred to and troublesome "noise" previously attending the operation of prior apparatus of this character, applicant's apparatus makes feasible reliable and accurate sensing of shield apertures 22 of minimized size.

Minimization of the size of the individual shield apertures 22 is made possible by a large reduction in the coupling capacitance 28 between an individual input conductor 14 and an individual readout conductor 16 required to effect reliable and accurate operation of applicant's reading apparatus. It will be appreciated that reductions in the size of the shield apertures 22 requisite to reliable and accurate sensing of the presence of the apertures in accordance with applicant's invention makes feasible the placement of a larger number of apertures in a card of any particular size or conversely a reduction in the size of the card required to accommodate any particular number of apertures. This advantage can be readily capitalized on by recording more information on a card of given size, using the larger number of apertures made possible, or by reducing the size of the card required to store a given amount of information, or both, as it may be desired to capitalize on the basic advantage of holes of minimized size.

While applicant's apparatus has been described in relation to the sensing of apertures in an electric shield forming a component of a card, it will be appreciated that the invention is applicable to the capacitive sensing of information representing apertures in an electric shield that may not necessarily be a component of a card.

The invention is claimed as follows:

I claim:

1. Apparatus for reading data cards incorporating an electric shield apertured selectively in a pattern representing recorded information, said apparatus comprising, in combination, a plurality of input conductors disposed generally in mutually parallel spaced relation to each other for disposition along one side of a card to be read, means for applying a voltage to the individual input conductors selectively, a plurality of readout conductors disposed generally in mutually parallel spaced relation to each other for disposition along the opposite side of the card to be read, said readout conductors being oriented in a generally transverse cross relation to said input conductors and being disposed in spaced relation to the latter to provide therebetween data card space and to provide between each input conductor and each readout conductor a capacitive coupling that is subject to blocking by an intervening conductive shield of a data card in said space, a plurality of voltage stabilizing capacitors corresponding to said respective readout conductors, each of said voltage stabilizing capacitors having an input side and an output side, the output side of each voltage stabilizing capacitor being connected t the corresponding readout conductor, a plurality of voltage stabilizing amplifiers corresponding to the respective readout conductors and being high gain voltage amplifiers with high input impedance, each of said voltage stabilizing amplifiers having its input connected to the corresponding readout conductor and having its output connected to the input side of the corresponding voltage stabilizing capacitor, the voltage stabilizing amplifier and the voltage stabilizing capacitor connected to each readout conductor having respectively a gain and a capacitance mutually related to each other to effect in response to an incipient change in voltage on the corresponding readout conductor a restoration of the original voltage on the readout conductor by a flow of electrical charge between the capacitor and the readout conductor induced by an amplified change in voltage applied by the amplifier to the input side of the capacitor so that the voltage on the readout conductor remains substantially unchanged by the energization of any of said input conductors to which the readout conductor is capacitively coupled through an aperture in the electrical shield interposed therebetween, and information-receiving means coupled to said input side of each of said voltage stabilizing capacitors to respond to the change of voltage applied to said input side of the capacitor by the corresponding voltage stabilizing amplifier as an incident to energization of an input conductor to which the corresponding readout conductor is coupled capacitively through an aperture in an intervening electrical shield.

2. Apparatus for reading a data storage element incorporating an electric shield apertured selectively in a pattern representing recorded information, said apparatus comprising, in combination, a plurality of input conductors for disposition along one side of a data storage element to be read, means for energizing said input conductors selectively, a plurality of readout conductors for disposition along the opposite side of the data storage element to be read to provide between individual input conductors and individual readout conductors capacitive couplings that are subject to blocking by a data storage element intervening between the input conductors and the readout conductors and incorporating an electric shield defining selectively positioned apertures providing for unblocked capacitive coupling therethrough of individual input conductors with individual readout conductors, a plurality of voltage stabilizing capacitors corresponding to said respective readout conductors, each of said voltage stabilizing capacitors having an input side and an output side, the output side of each voltage stabilizing capacitor being coupled to the corresponding readout conductor, a plurality of voltage stabilizing amplifiers corresponding to the respective readout conductors, each of said voltage stabilizing amplifiers having its input coupled to the corresponding readout conductor and having its output coupled to the input side of the corresponding voltage stabilizing capacitor, the voltage stabilizing amplifier and the voltage stabilizing capacitor corresponding to each readout conductor having respectively a gain and a capacitance mutually related to each other to effect in response to an incipient change in voltage on the corresponding readout conductor a substantial restoration of the original voltage on the readout conductor by a flow of electrical charge between the capacitor and the readout conductor induced by a change in voltage applied by the amplifier to the input side of the capacitor as an incident to the energization of any of said input conductors to which the readout conductor is capacitively coupled through an aperture in the electrical shield disposed therebetween and information-receiving means coupled to said input side of each of said voltage stabilizing capacitors to respond to the change of voltage applied to said input side of the capacitor by the corresponding voltage stabilizing amplifier as an incident to energization of an input conductor to which the corresponding readout conductor is coupled capacitively through an aperture in an intervening electrical shield.

3. Apparatus for reading a data storage element incorporating an electric shield apertured selectively in a pattern representing recorded information, said apparatus comprising, in combination, a plurality of energizable input conductors for disposition alongside a data storage element to be read, a plurality of readout conductors for disposition alongside the data storage element to provide between the input conductors and the readout conductors capacitive couplings that are subject to blocking by an intervening data storage element incorporating an electric shield defining selectively positioned apertures providing selectively for unblocked capacitive coupling therethrough of individual input conductors with individual readout conductors, a plurality of voltage stabilizing capacitors having outputs coupled with said respective readout conductors, a plurality of voltage stabilizing amplifiers having inputs coupled with said respective readout conductors and having outputs coupled to inputs of the corresponding voltage stabilizing capacitors, the voltage stabilizing amplifier and the voltage stabilizing capacitor corresponding to each readout conductor having respectively a gain and a capacitance mutually related to each other to effect as an incident to the energization of any of said input conductors to which the readout conductor is capacitively coupled through a shield aperture a substantial restoration of the original voltage on the readout conductor by a flow of electrical charge between the capacitor and the readout conductor induced by a change in voltage applied by the amplifier to the capacitor, and information-receiving means coupled to respond to the change of voltage applied to said respective voltage stabilizing capacitors by the corresponding voltage stabilizing amplifiers as an incident to energization of individual input conductors to which the readout conductors are coupled capacitively through shield apertures.

PO-1050
(5/69)

UNITED STATES PATENT OFFICE
CERTIFICATE OF CORRECTION

Patent No. 3,585,368 Dated June 15, 1971

Inventor(s) Thomas A. Nunamaker

It is certified that error appears in the above-identified patent and that said Letters Patent are hereby corrected as shown below:

Col. 1, line 56, Between "in" and "most" insert --a--;

line 64, Change "to capacitively apertures" to --of information apertures--;

Col. 3, line 53, Change "nd" to --and--.

Col. 5, line 17, Change "$1.5 \times 10^{1}13$" to --$1.5 \times 10^{-13}$--.

line 25, Change "$5 \times 10^{1}13$" to --$5 \times 10^{-13}$--.

line 54, Change "$2 \times^{7}$" to --$2 \times 10^{7}$--.

Col. 6, line 41, Change "$20 \times 10^{1}9$" to --$20 \times 10^{-9}$--.

line 48, Change "$10,000 \times 10^{1}9$" to --$10,000 \times 10^{-9}$--.

line 53, Change "100 x 109" to --$100 \times 10^{-9}$--;

Change $1,000 \times 10^{by}l9$" to --$1,000 \times 10^{-9}$--.

line 68, After "matrix" insert --comprising the input conductors 14, shield 20 and readout--.

Col. 7, line 61, Change "t" to --to--.

Signed and sealed this 16th day of November 1971.

(SEAL)
Attest:

EDWARD M.FLETCHER,JR.
Attesting Officer

ROBERT GOTTSCHALK
Acting Commissioner of Patents